(12) United States Patent
Khan

(10) Patent No.: US 7,956,941 B2
(45) Date of Patent: Jun. 7, 2011

(54) METHOD AND APPARATUS FOR REDUCING SPECKLE IN COHERENT LIGHT

(75) Inventor: Sajjad Ali Khan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 131 days.

(21) Appl. No.: 11/832,479

(22) Filed: Aug. 1, 2007

(65) Prior Publication Data

US 2009/0033814 A1 Feb. 5, 2009

(51) Int. Cl.
*G02F 1/133* (2006.01)
*G02F 1/1333* (2006.01)
*G09G 3/36* (2006.01)

(52) U.S. Cl. ............................... 349/33; 349/88; 345/94

(58) Field of Classification Search .................. 349/87, 349/90, 94, 33, 88; 345/94
See application file for complete search history.

(56) References Cited

U.S. PATENT DOCUMENTS

| 3,650,608 | A | | 3/1972 | Baker |
| 5,241,416 | A | * | 8/1993 | Mitsutake et al. ............. 359/456 |
| 5,796,447 | A | * | 8/1998 | Okumura et al. ............... 349/33 |
| 6,100,862 | A | * | 8/2000 | Sullivan ......................... 345/88 |
| 6,122,023 | A | | 9/2000 | Chen et al. |
| 7,339,636 | B2 | * | 3/2008 | Voloschenko et al. .......... 349/61 |
| 2005/0117096 | A1 | * | 6/2005 | Voloschenko et al. ........ 349/114 |
| 2005/0207007 | A1 | * | 9/2005 | Shimoda et al. .............. 359/449 |

* cited by examiner

*Primary Examiner* — Mark A Robinson
*Assistant Examiner* — Paul C Lee
(74) *Attorney, Agent, or Firm* — Charles A. Brill; Wade James Brady, III; Frederick J. Telecky, Jr.

(57) ABSTRACT

According to one embodiment, a method for reducing speckle in an image produced from a coherent light source includes directing a beam of coherent light at an electrically controlled diffuser. An electrical signal is applied to the electrically controlled diffuser to produce an electrical field across the electrically controlled diffuser layer. At least one of an amplitude and a frequency of the electrical signal are varied to transition the controlled diffuser between a first state and a second state. The varied application of the electrical signal operates to reduce spatial coherence in an image projected through the electrically controlled diffuser.

22 Claims, 7 Drawing Sheets

METHOD AND APPARATUS FOR REDUCING SPECKLE IN COHERENT LIGHT

TECHNICAL FIELD OF THE INVENTION

This invention relates generally to display systems and more particularly to a method and apparatus using liquid crystal films to reduce speckle in coherent light.

BACKGROUND OF THE INVENTION

Televisions and other types of imaging systems are pervasive in today's society. Recent years have seen the introduction of higher definition imaging systems. Engineers continue to try to increase the resolution and brightness of imaging systems to provide better picture quality, but also face constraints associated with providing such increased resolution and brightness.

For example, to increase brightness in imaging display systems, coherent light sources such as lasers may be used in the place of incoherent light sources such as light-emitting-diodes (LEDs) and lamps. However, while coherent light sources may increase the brightness of the display system, such light sources often produce images having a noticeable granularity. This grainy pattern, also known as speckle or the scintillation effect, arises due to the highly narrowband and polarized nature of the coherent light incident on a diffuse surface. Speckle has been attributed to the fact that coherent light reflected by or through a diffusing produces a complex, random, but stationary diffraction pattern. Specifically, speckle originates when the coherent plane phase front from a laser traverses through a medium with optical path length differences that are less than or equal to the coherence length of the laser. Such path length differences can occur as a result of surface roughness, scratches, digs, and polishing imperfections in optical elements.

SUMMARY OF THE INVENTION

According to one embodiment, a method for reducing speckle in an image produced from a coherent light source includes directing a beam of coherent light at an electrically controlled diffuser. An electrical signal is applied to the electrically controlled diffuser to produce an electrical field across the electrically controlled diffuser layer. At least one of an amplitude and a frequency of the electrical signal are varied to transition the controlled diffuser between a first state and a second state. The varied application of the electrical signal operates to reduce spatial coherence in an image projected through the electrically controlled diffuser.

Some embodiments of the invention provide numerous technical advantages. Some embodiments may benefit from some, none, or all of these advantages. For example, according to one embodiment, fewer moving parts are used for speckle reduction. As a result, system components are subject to less wear and tear. Additionally, product assembly may be made easier as compared to motion-based systems that required a motor and adequate spacing to accommodate moving components. The reduction in spacing between optical elements may help improve the form factor of the projector.

Still another advantage may be that, because low drive voltages are required to manipulate the molecular structure of the electrically controlled diffuser 104, the described system consumes less power than prior motion-based systems. Further, the lack of moving parts may improve user satisfaction since the amount of noise associated with working components may be reduced Still another advantage may be that in a rear projection system the Fresnel lens may be made thinner and more compact. Specifically, since the Fresnel lens is not moving, it is less susceptible to bowing. Accordingly, it may be made thinner. Further, since no separation is needed between the Fresnel lens and the lenticular to separate moving parts, the cabinet in which the imaging system is housed may be made smaller.

Other technical advantages may be readily ascertainable by one of skill in the art.

BRIEF DESCRIPTION OF THE FIGURES

For a more complete understanding of the invention, and for further features and advantages, reference is now made to the following description, taken in conjunction with the accompanying drawings, in which.

DETAILED DESCRIPTION OF THE INVENTION

Embodiments of the invention and its advantages are best understood by referring to FIGS. 1-4 of the drawings, like numerals being used for like and corresponding parts of the various drawings.

When a visible coherent light beam, such as that from a laser, for example, illuminates a fixed diffuse reflecting surface such as a matte white screen, the illuminated area has a sparkling appearance. The same observation can be made when such a coherent light beam is directed onto a stationary diffuse optical transmission surface such as a rear projection display screen. The sparkling appearance results in images having a noticeable granularity. This grainy pattern is also referred to as speckle or the scintillation effect.

One approach to diminish the visibility of speckle utilizes motion to break up the stationary diffraction pattern caused by coherent light. In such a system, one or more elements of the imaging system that have diffusion properties are continually vibrated, rotated, or moved relative to other elements of the imaging system. For example, a coherent light source may be rotated in a continuous manner about the optical axis of the system to partially eliminate the coherence between the source and the object. As another example, the diffuse screen may be set into a constant vibratory motion.

Figure 1:
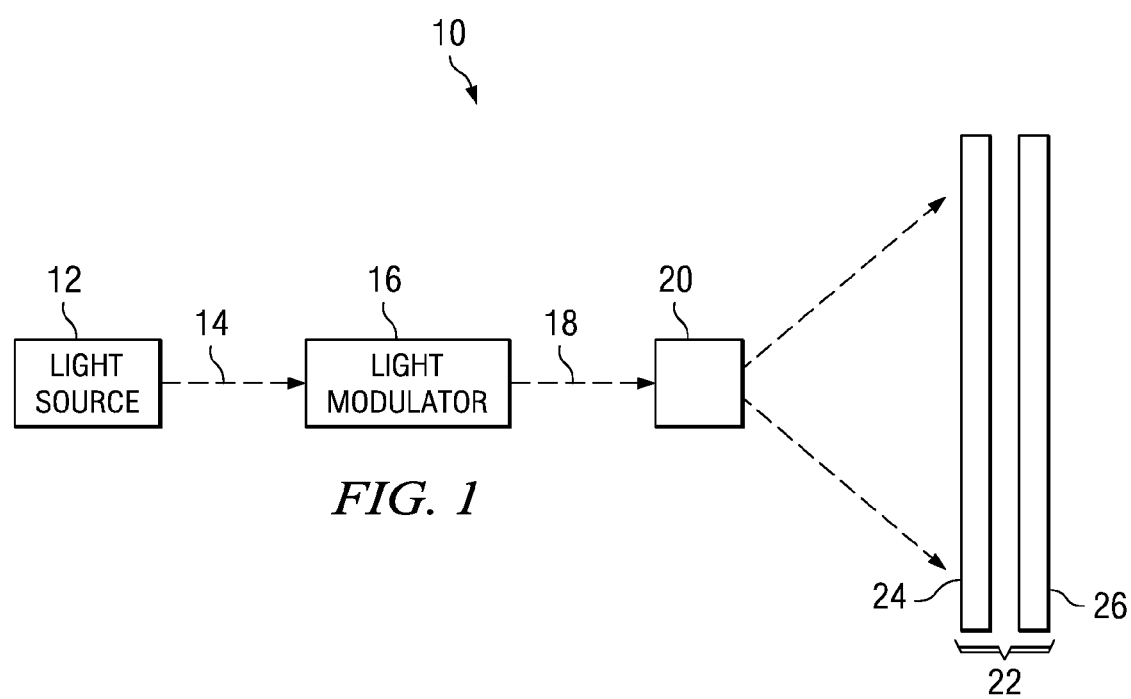
FIG. 1 is a schematic diagram illustrating one system for reducing speckle in a projection imaging system 10.

FIG. 1 is a schematic diagram illustrating one approach to reduce speckle in a projection imaging system 10. Imaging system 10 includes a light source 12 capable of generating a coherent light beam 14. In particular embodiments, light source 12 includes one or more lasers that directs coherent light beam 14 through light modulator 16 in which the intensity or brightness of the light beam is varied in accordance with a predetermined input signal. From the light modulator 16, the intensity modulated laser beam 18 is directed to a light beam deflector 20, which causes the light beam to be deflected in a predetermined pattern. This pattern represents the image that is projected or displayed upon screen 22.

The projection display screen 22 includes a first transparent substrate 24, for example a planar sheet of glass or plastic. The display screen also includes a second substrate 26, which may be similar to first substrate 24. In rear projection display embodiments, substrate 24 may include a Fresnel lens, and substrate 26 may include a lenticular array. A Fresnel lens as incorporated in certain rear projection display systems includes a lens that collimates light resulting in a substantially parallel light beam. A lenticular array typically includes an array of small, cylindrical lenses that are vertically disposed to expand the light to the viewer in the horizontal direction. The expansion of the incoming projected light in the vertical dimension, for observation by the viewer, is carried out by including an appropriate amount of optical diffusion in either the Fresnel lens, the lenticular array, or a combination thereof. Alternatively, the same functionality as the lenticular array may be achieved by either waveguides, or beads, or holographic elements to essentially achieve the same effect, i.e., to disperse light towards the viewer and produce a desired viewing angle for the display.

In front projection display embodiments, substrate 24 may include slightly diffusive properties, and substrate 26 may have highly reflective diffusive properties.

In order to prevent the speckle effect in either the rear projection or the front projection application, one of substrate 24 and substrate 26 is coupled to a motor or other source or sources of mechanical movement. The motor operates to mechanically reduce speckle by vibrating and/or moving one of substrates 24 and 26 in a substantially continuous path. For example, in a rear projection display embodiment, substrate 24 may be moved in a circular path or vibrated in the plane of substrate 24. Alternatively, in a front projection display embodiment, substrate 26 may be moved in a circular path or vibrated in the plane of substrate 26. Typically, where the screen consists of two or more optical elements, one element with diffusion properties may be moved with respect to another element that has diffusion properties. The movement of one such element having diffusion properties with respect to another element having diffusion properties results in the outgoing coherent light phase-front being continuously varied as a function of time. If such a phase-front variation is carried out within the integration time of the observation, such as the human eye or a camera, the spatial coherence of the coherent light may be reduced. Accordingly, provided the amount of the diffusion and the extent of the motion are appropriate, the speckle effect may be reduced.

Although the mechanical agitation of substrate 24 and/or substrate 26 reduces the visible speckle effect and, thus, improves the displayed image, such motion is undesirable since it affects the long term reliability of system 10. For example, a motor may result in a shorter lifespan of imaging system 10 and may result in more wear and tear on components included in imaging system 10. Additionally, a motor may produce audible noise that is undesirable to the viewer. Viewers may be further disappointed in the performance of imaging system 10 if the motion is visible to the viewer. This may be noticed in rear projection systems where the viewing screen has high gain. Motion visibility is a particular problem in imaging systems where the motion of any of the substrates is visible to the viewer causing distraction from the original object of observation.

Additionally, the mechanical agitation of substrate 24 and/or substrate 26 results in the overall dimensions of the imaging system 10 being increased, which is generally regarded as undesirable. Specifically, the optical component subject to the vibration (i.e., substrate 24 in the illustrated embodiment) must be thicker than otherwise necessary so as to prevent bowing caused by the movement. An increased depth of the optical component may result in an increased depth of the housing. Housing depth is also affected by the amount of spatial distance required between the two substrates 24 and 26. To prevent collision and rubbing of the two substrates 24 and 26 when one of them is vibrated, the spatial distance between the two must be greater than otherwise required. For example, at least two millimeters of space may be required between substrates 24 and 26 to prevent collision when one substrate is vibrated or rotated while the display 10 is in a vertical orientation. More spacing may be required between the two substrates in scenarios where the display is tilted upwards or downwards since such tilting may cause bowing of the substrates. More separation is needed in this instance to prevent substrates 24 and 26 from rubbing against one another. As described above, the substrate selected to be moved depends upon whether the display 22 is incorporated in a rear or front projection display system. In the rear projection display embodiment, substrate 24 may be moved relative to substrate 26. In a front projection display embodiment, substrate 26 may be moved relative to substrate 24. Typically, the substrate farther from the viewer is the substrate that is subject to movement.

It is, therefore, desirable to provide an imaging system that eliminates or reduces the speckle effect without requiring rotational or vibrating movement of the components of the imaging system. It is desirable to create a non-moving display screen or apparatus which will in itself destroy or eliminate the speckling observed when coherent light from a source such as, for example, light source 12 is directed upon a screen such as screen 22 to display an image.

Figure 2A:
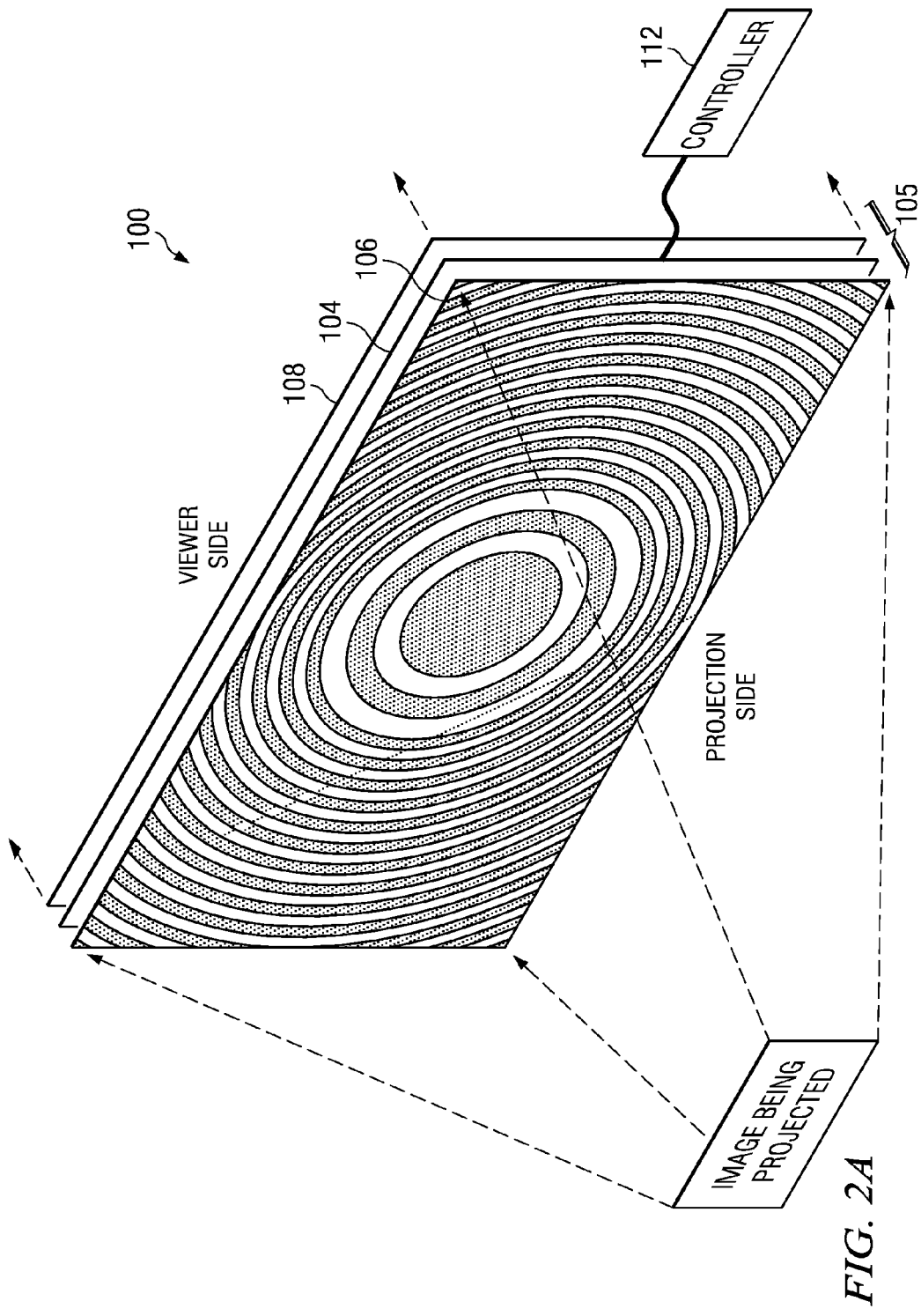
FIGS. 2A and 2B are schematic diagrams illustrating techniques for reducing speckle in a rear projection image system and a front projection image system, respectively, according to embodiments of the present invention.
Figure 2B:
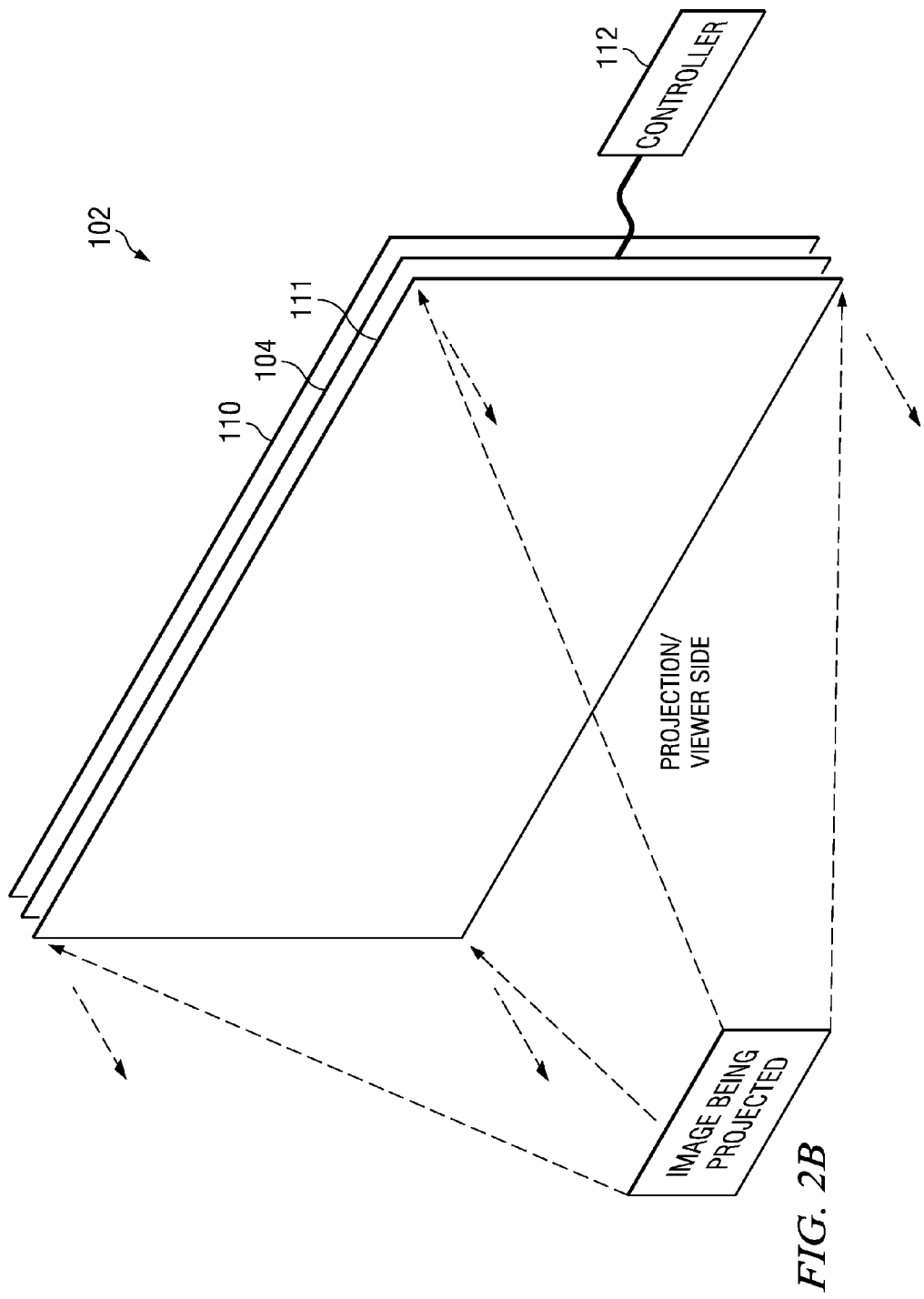

FIGS. 2A and 2B are schematic diagrams illustrating techniques for reducing speckle in an imaging system, according to particular embodiments. Specifically, FIG. 2A illustrates a system 100 for reducing speckle in a rear projection imaging system. Conversely, FIG. 2B illustrates a system 102 for reducing speckle in a front projection image system. In each system, the screen of the display system is modified from that illustrated in FIG. 1. The modified display screen includes an electrically controlled diffuser 104 that operates to reduce spatial coherence in the image displayed by the display system.

In system 100 of FIG. 2A, screen 105 includes a first substrate 106 and a second substrate 108. Electrically controlled diffuser 104 is disposed between first substrate 106 and second substrate 108. Thus, in particular embodiments where first substrate 106 comprises a Fresnel lens and second substrate 108 comprises a lenticular array, electrically controlled diffuser 104 is sandwiched between the Fresnel lens and the lenticular array.

In contrast to the rear projection imaging system 100 of FIG. 2A, front projection imaging system 102 of FIG. 2B includes a single reflective diffusing screen 110 and a slightly diffusive substrate 111. In particular embodiments, for example, a slightly diffusive substrate may have a Full-Width Half Maximum (FWHM) diffusion angle on the order of approximately 0.1° to 40°. Electrically controlled diffuser 104 may be sandwiched between reflective diffusing screen 110 and the slightly diffusive substrate 111. Slightly diffusive substrate 111 is disposed between the light modulator and diffusing screen 110. Slightly diffusive substrate 111 may be flexible or rigid, in various embodiments, and may be comprised of plastic, glass, composite material, or any other appropriate material. Optical properties of substrate 111 may include a small FWHM diffusion angle or a large diffusion angle. For example, in a particular embodiment, optical properties of substrate 111 may include a small FWHM diffusion angle on the order of approximately 0.1 degree. In another example embodiment, optical properties of substrate 111 may include a large FWHM diffusion angle on the order of approximately 40 degrees. In still another example embodiment optical properties of substrate 11 may vary anywhere between 0.1 and 40 degrees. In some embodiments, substrate 111 may also be a volume diffuser to further help reduce speckle by making use of multipoint scattering inside the volume diffuser.

In particular embodiments, electrically controlled diffuser 104 may be activated by transparent electrodes disposed on the surfaces adjacent to electrically controlled diffuser 104. For example, in the front projection application, transparent electrodes may be disposed on the inner surfaces of diffusing screen 110 and slightly diffusive substrate 111. Similarly, in the rear projection application, transparent electrodes may be disposed on the inner surfaces of first substrate 106 and second substrate 108. The transparent electrodes may include either low or high resistive electrodes with multiple electrical contact elements for applying voltage and hence obtaining phase gradients for speckle reduction. For example, electrically controlled diffuser 104 may be activated by Indium tin oxide (ITO) electrodes, in particular embodiments. ITO is typically used as a low impedance (i.e., high conductivity) transparent electrode. Use of other materials that have a higher impedance, as electrodes opens the possibility of forming voltage gradients that result in phase gradients across the LC layer aperture enabling steering of he optical phase front to reduce speckle. Multiple electrical contacts at such a high impedance electrode can be deposited. Application of different voltages on these contacts will allow the steering of the optical beam in several different directions in parallel further helping in speckle reduction. These voltages can be dynamically varied in time thus further reducing speckle.

In particular embodiments, electrically controlled diffusers 104 utilize liquid crystal (LC) technology. A variety of LC materials are known in the art and may be incorporated into screen 105 of imaging system 100 and screen 110 of imaging system 102 for use as an electrically controlled diffuser 104. In particular embodiments, these LC materials may include Nematic LC (NLC), Bi-stable Nematic LC, Cholesteric LC (ChLC), Polymer Dispersed LC (PDLC), Polymer Stabilized LC (PSLC), Discotic LC, or Ferroelectric LC (FLC). It is generally recognized, however, that other electro-optic materials not having a homogenous, crystalline geometry may also be used.

Figure 3A:
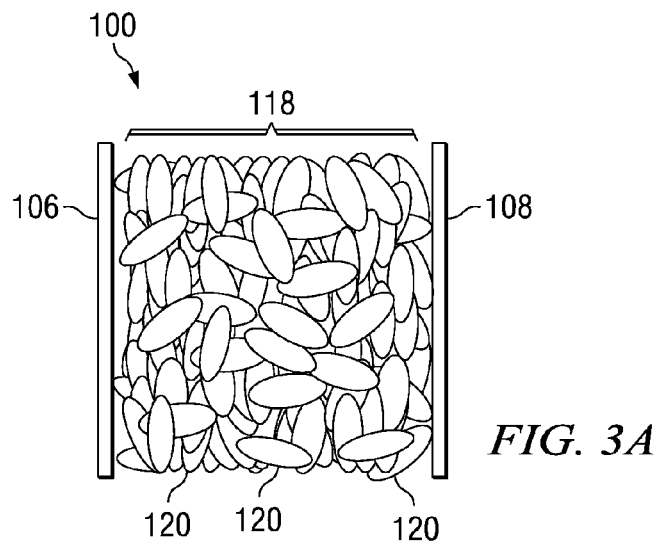
FIGS. 3A-3C are schematic diagrams illustrating the varied molecular orientations obtained by an electrically controlled diffuser, according to an embodiment of the present invention.

In general, the LC material of electrically controlled diffuser 104 is comprised of a multitude rod-like or elliptical shaped molecules. In the case of Discotic LC material, the molecules may be disc-shaped. For example, FIG. 3A illustrates a typical molecular orientation of an NLC layer 118 as incorporated into rear projection system 100. In its natural or typical state, the molecular orientation of the long rod or elliptical shaped molecules 120 is random. Stated differently, there is no uniform alignment of molecules 120 with respect to each other or with respect to substrates 106 and 108. Compared to typical LC orientation in aligned cells, the molecular director does not have a preferential orientation in this state due to the absence of the alignment layers. Alternatively, one can say that the molecular directors of molecules 120 randomly varies in all three dimensions spatially across the NLC layer 118. In this natural or unaltered state, NLC layer 118 will result in diffusion of coherent light.

Figure 3B:
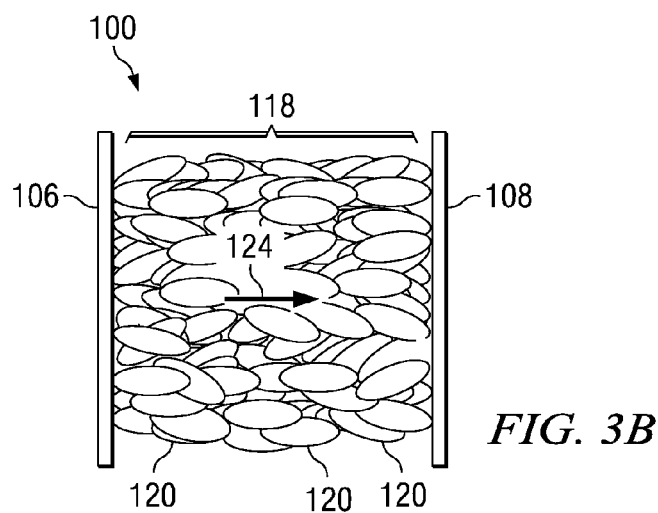

However, when an appropriate electrical signal is applied across the NLC layer 118 with the use of transparent electrodes that are deposited on substrates 106 and 108, the directors of molecules 120 may be altered such that the rod-like elliptical molecules 120 seek to align with an applied electrical field 124. For example, when an intermediate voltage is applied, molecules 120 may begin to align with the applied electrical field 124, as shown in FIG. 3B. As can be seen in FIG. 3B, molecules 120 have rotated such that the longer axes of molecules 120 begin to align with and be substantially parallel to the applied electrical field 124. Stated differently, molecules 120 seek to position themselves such that the extraordinary index of molecules 120 is generally perpendicular to substrates 106 and 108. In this altered state, NLC layer 118 will result in some diffusion of coherent light; however, the amount of diffusion will be less than the amount of diffusion of NLC layer in its natural state.

Figure 3C:
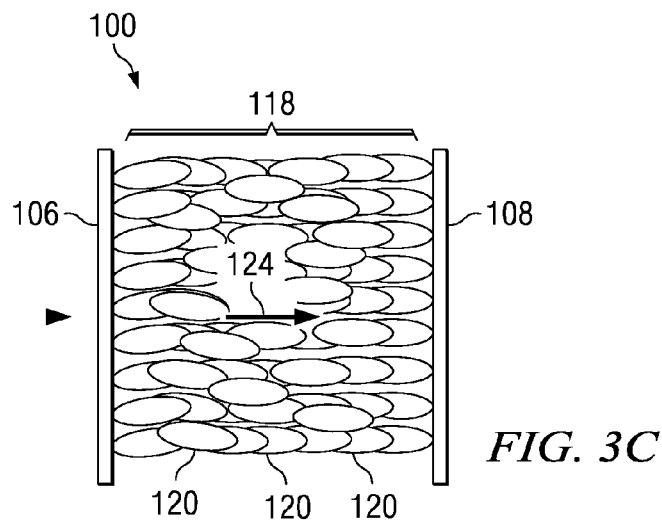

The more voltage applied across the NLC layer 118, the more aligned the molecules 120 become with the electrical field 124. For example, FIG. 3C illustrates NLC layer 118 as a higher voltage is applied. During the application of the higher voltage, the vibration of molecules 120 may cease or substantially cease. Additionally, all or a substantial portion of molecules 120 may be generally aligned with the applied electrical field 124. In this further altered state, NLC layer 118 will result in very little diffusion of coherent light.

Thus, it can be seen from FIGS. 3A-3C that a voltage may be selectively applied to an LC layer to result in predictable variation in the molecular structure. Accordingly, returning to FIGS. 2A and 2B, imaging systems 100 and 102 are each illustrated as including a controller 112. Electrically controlled diffusers 104 are connected to and receive electrical drive signals from controllers 112. In operation, controllers 112 are used for the selective manipulation of the orientation of molecules 120 within electrically controlled diffuser 104.

Figure 4:
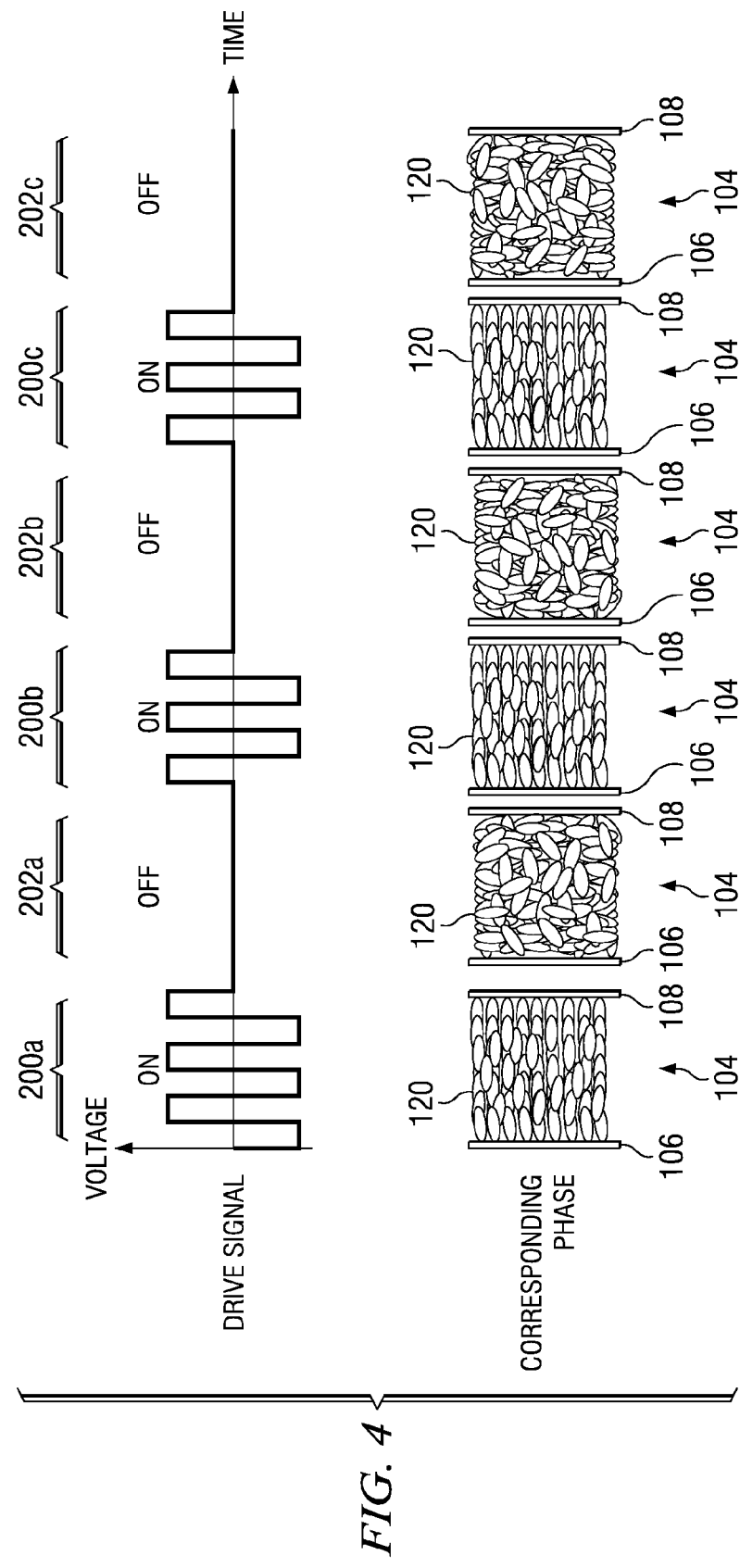
FIG. 4 is a schematic diagram illustrating spatial phase variations that may be achieved by alternating the electrically controlled diffuser between on and of states, according to an embodiment of the present invention.

In a particular embodiment, a controller 112 may be used to selectively transition electrically controlled diffuser 104 between on and off states to generate predictable phase variations. FIG. 4 is a schematic diagram illustrating spatial phase variations that may be achieved by alternating the electrically controlled diffuser between on and off states, according to a particular embodiment. However, FIG. 4 is not intended to represent an exact timing diagram. FIG. 4 merely represents the bulk molecular orientation of molecules during the majority of the drive signal On and Off times.

As schematically illustrated in FIG. 4, the on state 200 corresponds with a period of time during which an electrical current is applied to electrically controlled diffuser 104. While in the on state 200, the molecular orientation of molecules 120 within electrically controlled diffuser 104 may be in general alignment with the applied electrical field 124. Thus, when the electrical field 124 is applied to electrically controlled diffuser 104 in a direction that is substantially perpendicular to substrates 106 and 108 (or reflective diffusing screen 110 and slightly diffusive substrate 111 in a front projection system), molecules 120 seek to position themselves such that the extraordinary index of molecules 120 is also generally perpendicular to substrates 106 and 108 (or reflective diffusing screen 110 and slightly diffusive substrate 111 in a front projection system). Due to the aligned molecular structure of electrically controlled diffuser 104, little or no coherent light may be diffused by electrically controlled diffuser 104 during the on state 200.

In contrast, the off state 202 corresponds with a period of time during which no electrical signal is applied to the electrically controlled diffuser 104. While in off state 202, the molecular orientation of molecules 120 within electrically controlled diffuser 104 may be random. No predictable pattern may be recognized with respect to molecules 120. The random orientation of the molecules with electrically controlled diffuser 104 may result in diffusion of coherent light during the off state 202.

For the period of time illustrated in FIG. 4, electrically controlled diffuser 104 is alternated between the on and off states (and vice versa) six times. As stated above, each of the on and off states results in a corresponding phase variation. As used herein, the term phase variation refers to the spatially random phase accumulated by an optical phase-front traversing through the molecular orientation of molecules 120 during any given state. Thus, six phase variations of electrically controlled diffuser 104 are shown in FIG. 4. Because molecules 120 seek to align in a predictable manner during the on state 200, the molecular orientation of molecules 120 during on state 200a is substantially the same as the molecular orientation of molecules 120 during on state 200b and on state 200c. Accordingly, the phase variations corresponding with on states 200a, 200b, and 200c are substantially the same as one another. Additionally, the reduction in diffusion of coherent light is approximately the same at each of states 200a, 200b, and 200c.

In contrast, when the electrical signal is turned off during an off state 202a, 202b, or 202c, molecules 120 will return to a random orientation. However, the phase variations corresponding with off states 202a, 202b, and 202c are different from one another. Thus, the molecular orientation of molecules 120 is different during off state 202a than the orientation of molecules 120 during off state 202b or off state 202c. As a result, each phase variation corresponding with an off state 202 produces a different molecular structure, and thus, results in a different optical phase-front. The diffusion amount varies spatially across the LC layer 118 in each phase. Accordingly, taking into consideration both the on states 200 and the off states 202, electrically controlled diffuser 104 produces four different optical phase-front variations during the time period illustrated in FIG. 4. A single phase variation is produced during on states 200a, 200b, and 200c. Three distinct phase variations are produced during off states 202a, 202b, and 202c.

During the on states 200, NLC layer 118 is substantially transparent. As a result, diffusion of coherent light is reduced. The reduction in diffusion results in a higher degree of spatial coherence in an image projected through electronically controlled diffuser 104. Generally, spatial coherence describes the ability for two points in the extent of a wave to interfere, when averaged over time. More precisely, spatial coherence is the cross-correlation between two points in a wave for all times. This is in contrast to temporal coherence, which is the measure of the average correlation between the value of a wave at every pair of times separated by delay T. Thus, temporal coherence relates to the spectral distribution of the light source. For narrowband sources such as lasers, the temporal coherence is typically much longer than that for broadband sources and hence cannot be changed easily without significant degradation in performance such as efficiency and color saturation. In other words, while temporal coherence characterizes how well a wave can interfere with itself at different times, spatial coherence characterizes how well two points in a wave can interfere at a single point in time. In the spatio-temporal-phase variations illustrated in FIG. 4, spatial coherence of the image transmitted through electrically controlled diffuser 104 during the on state 200 will form a certain speckle pattern on the observer's retina. During each off state, this speckle pattern on the retina will change to a different pattern. Multiple such speckle patterns (or modes) will combine in a single integration time of the observer's retina to produce a reduced speckle image for the observer.

Some LC materials that may be used in electrically controlled diffuser 104 may have finite rise and fall times. Both the rise and the fall time have a square dependence upon the thickness of the LC layer. Whereas the fall time depends upon the visco-elastic coefficient of the LC material and not the applied voltage, the rise time has an inverse relationship with the applied voltage. When electrically controlled diffuser is turned from an off state 202 to an on state 200, it may take about 100 micro-seconds for molecules 120 to align to a new state. For example, for a certain example LC material, it may take approximately one hundred microseconds for electrically controlled diffuser 104 to transition from the off state 202 to an on state 200 for a 20V applied signal. The transition from an on state 200 to an off state 202 (the fall time) may be even longer since it depends upon the visco-elastic coefficients of the LC material and not the applied voltage. For example, when electrically controlled diffuser is turned from an on state 200 to an off state 202, it may take approximately one millisecond for molecules 120 to return to a random orientation.

A system incorporating the electrically controlled diffuser 104 of the above-described figures provides various advantages over prior systems that required physical movement of system components. For example, according to one embodiment, no moving parts are required for speckle reduction. As a result, system components are subject to less wear and tear. Additionally, product assembly may be made easier as compared to motion-based systems that required a motor and adequate spacing for moving parts. Still another advantage may be that, because low drive voltages are required to manipulate the molecular structure of the electrically controlled diffuser 104, the described system consumes less power than prior motion-based systems. Furthermore, an advantage may be that the lack of moving parts may improve user satisfaction since the noise associated with working components is not present as is the absence of the visible motion.

Still another advantage may be that in a rear projection system the Fresnel lens may be made thinner and more compact. Specifically, since the Fresnel lens is not moving, it is less susceptible to bowing. Accordingly, it may be made thinner. Further, since no separation is needed between the Fresnel lens and the lenticular to isolate moving parts, the housing in which the imaging system is contained may be made smaller and more compact.

Furthermore, in some locations it is desired to place the display on a high wall and tilt it downwards or upwards for a better viewing experience. Such tilting may cause additional bowing and bending of the thick Fresnel lens in motion based speckle redution approaches. An LC based electrically controlled diffuser, however, may mitigate these drawbacks by allowing a thinner Fresnel lens that will be supported by the Lenticular array and bezel and will have lesser gravitational pull and bowing due to its lesser weight.

Although prior systems did not provide many of the benefits described above, motion-based speckle-reduction systems have been used to produce sufficient independent speckle reduction modes to remove the speckle pattern from the display screen as viewed by the audience. For a perfectly coherent light source, the measured speckle contrast is one-hundred percent. An acceptable value of speckle contrast for an average viewer is roughly below four percent. To bring the speckle contrast from one-hundred percent to four percent requires approximately six hundred independent speckle patterns (or modes) in a single integration time of the human eye (or observer/sensor, if it is a non-human observer, e.g.: CCD camera etc.). A typical moving screen provides about 4 independent speckle modes in a single integration time of the human eye, which is approximately 16.67 milliseconds. Additional speckle modes may be generated by other optical components inside the display optics. For an LC based electrically controlled diffuser 104 to match the performance of a moving screen based speckle reduction mechanism, it should generate at least the same number of speckle modes during a single integration time of the human eye. This requires that electrically controlled diffuser 104 be alternated between on and off states at a rate which results no more than 4.17 msec between the initiation of two sequential on states. Stated differently, $$t_{on}+t_{off} \leq 4.17 \text{ msec}$$

It is generally recognized that the 4.17 millisecond time frame may be allocated between on and off states in any desired or practical manner. In a preferred embodiment, however, electrically controlled diffuser may be operated in an on state 200 for approximately 0.10 milliseconds and in an off state for approximately 1 millisecond. Alternating between on and off states in this manner enables electrically controlled diffuser to provide approximately sixteen independent speckle reduction modes and, thus, provides an improvement over prior systems using moving screens.

In some systems it may be desirable to improve the response time of molecules 120 when transitioning between on and off states. In particular embodiments, it may be desirable to increase the voltage applied to molecules 120 during an on state 200. A higher voltage when transitioning from an off state 202 (random) to an on state 200 (aligned) may decrease the response time of molecules 120. Because the higher voltage may not be required to maintain molecules 120 in the aligned molecular orientation, the electrical signal amplitude may be increased temporarily in the first portion of on state 200 and then decreased to the typical electrical signal amplitude during the remaining portion of the on state 200.

Although improving the transition from an off state 202 (random) to an on state 200 (aligned), increasing the electrical signal amplitude applied to electrically controlled diffuser 104 may have no effect on the response time of molecules 120 when going from the on state 200 (aligned) to the off state 202 (random). However, increasing the drive frequency at the end of the on state 200 may reduce molecular response time for a certain type of LC materials in which the dielectric anisotropy changes sign from a typically positive dielectric anisotropy at low frequencies (a few KHz) to a negative dielectric anisotropy at relatively higher frequencies (tens of KHz). Additionally, the increased drive frequency at the end of the on state 200 may result in molecules 120 more quickly returning to a random state.

Other techniques may additionally or alternatively be used to improve response time of molecules 120 or to produce a greater number of speckle-reduction modes. For example, in particular embodiments, higher birefringence and lower viscosity materials may be used to improve response time. As another example, multiple electrically controlled diffusers 104 may be cascaded together. Controller 112 may operate to toggle the drive signals received by cascaded diffusers 104 to increase the number of speckle modes generated. Cascaded diffusers 104 may be toggled to get constant diffusion at any instant in time.

Figure 5A:
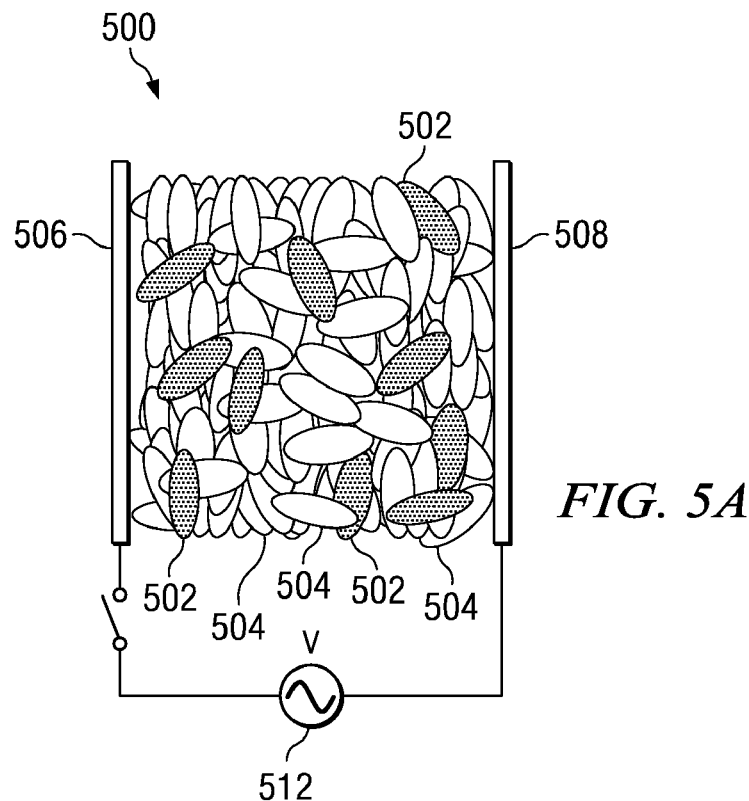
FIGS. 5A-5B are schematic diagrams illustrating an electrically controlled diffuser incorporating two different nematic liquid crystal material types to result in additional speckle reduction modes, according to an embodiment of the present invention.
Figure 5B:
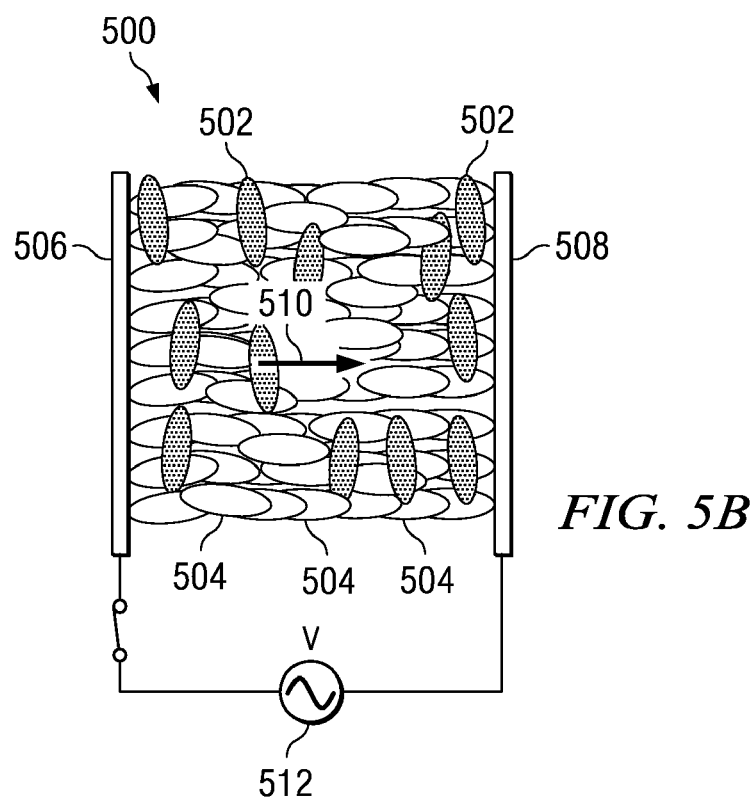

As another example modification to the above described system, two or more different LC materials may be disposed together to result in additional speckle reduction modes that may be collectively or independently activated by controller 112. FIGS. 5A and 5B illustrate such an embodiment. Specifically, the LC material of electrically controlled diffuser 500 is comprised of two distinct LC materials. Molecules representative of the first LC material are identified in FIGS. 5A and 5B with reference numeral 502. By contrast, molecules representative of the second LC material are identified in FIGS. 5A and 5B with reference numeral 504.

In particular embodiments, the first and second LC materials may be comprised of positive dielectric anisotropy and negative dielectric anisotropy LC materials, respectively. Thus, molecules 502 may consist of positive dielectric anisotropy, i.e.: materials that have a $\Delta \in$ of greater than zero. In contrast, molecules 504 may consist of negative dielectric anisotropy, i.e.: materials that have a $\Delta \in$ of less than zero.

Specifically, FIG. 5A illustrates a typical molecular orientation of molecules 502 and molecules 504 in their natural or typical states. As such, the molecular orientation of molecules 502 and molecules 504 is random. Stated differently, there is no uniform alignment of molecules 502 and molecules 504 with respect to each other or with respect to the outer substrates 506 and 508 confining molecules 502 and molecules 504. Compared to typical LC orientation in aligned cells, the molecular directors of molecules 502 and molecules 504 do not have a preferential orientation in this state due to the absence of the alignment layers. Alternatively, one can say that the molecular directors of molecules 502 and molecules 504 randomly vary in all three dimensions spatially across the LC layer. In this natural or unaltered state, electrically controlled diffuser 500 will result in diffusion of coherent light since the index is varying in all three dimensions. Sated differently, in the natural state, electrically controlled diffuser 500 operates as a volume diffuser. If the two molecule types 502 and 504 are chosen such that they have different birefringence values, i.e.: $\Delta n$, then the spatial phase variation in the LC layer may further be higher than that obtained with the use of a single molecule type.

FIG. 5B illustrates molecules 502 and molecules 504 after an electrical signal is applied across the LC layer. As discussed above, transparent electrodes deposited on the inner surfaces of substrates 506 and 508 may be used to apply the electrical field across the LC layer. The application of the electrical signal results in the directors of molecules 502 and molecules 504 being altered. Specifically, as can be seen from FIG. 5B, molecules 502 of materials of positive dielectric anisotropy align their long axes along the applied E-field, and molecules 504 of materials of negative dielectric anisotropy align their long axes perpendicular to the applied E-field. Stated differently, because molecules 502 have a $\in$ of greater than zero, the rod-like elliptical molecules 502 seek to align with applied electrical field 510. Because molecules 504 have a $\Delta \in$ of less than zero, however, the rod-like elliptical molecules 505 seek to align in a direction that is substantially perpendicular to applied electrical field 510. Thus, molecules 502 seek to position themselves such that the extraordinary index of molecules 502 is generally perpendicular to substrates 506 and 508, and molecules 504 seek to position themselves such that the extraordinary index of molecules 504 is generally parallel to substrates 506 and 508. In this altered state, the amount of diffusion of coherent light will be slightly less than the amount of diffusion of electrically controlled diffuser 500 in its natural state.

In particular embodiments, it may be desirable to selectively apply the electrical signal to electrically controlled diffuser 500 to result in the predictable and selective variation of the molecular orientations of molecules 502 and 504. For example, a controller 512 may be used to selectively activate molecules 502 and molecules 504 at separate intervals. As a result, multiple phases may be achieved. One phase may occur when both molecules 502 and molecules 504 are in an on state. A second phase may occur when molecules 502 are in an off state and molecules 504 are in an on state. A third phase may occur when molecules 502 are in an on state and molecules 504 are in an off state. Finally, because the orientation of molecules 502 and molecules 504 is random when in an off state, each time the molecules 502 and molecules 504 are both in an off state, an additional, distinct phase may be achieved. Accordingly, a controller 512 may be used for the selective manipulation of the orientation of molecules 502 and 504 in a manner that is independent with one another to achieve a desired number of phases. Moreover, the electrical drive signal frequency and amplitude can be controlled in a fashion to selectively turn one molecule type on and the other off or both of them on and off simultaneously. This will provide substantially more independent speckle modes to further help in speckle reduction using the electrically controlled diffuser. The two molecule types can be selectively chosen to have different drive frequencies and threshold voltages. Intelligent control of the electrical drive signal using a summing amplifier for multiple drive frequencies can be utilized to further reduce speckle. Furthermore, more than two molecule types having different dielectric anisotropies $\Delta\in$, birefringences $\Delta n$, drive frequencies and threshold voltages, can also be used in a single electrically controlled diffuser for further speckle reduction.

Yet another possibility is to include more than one LC material type inside a single electrically controlled diffuser. For example, two LC material types, such as Ferroelectric LC (FLC) and Nematic LC (NLC), may be included in a single electrically controlled diffuser to provide a different diffusion amount as the voltage is varied. The different molecule types may behave differently with respect to the applied E-field when a voltage is varied. Because the two different molecule types behave differently, such an embodiment may result in further speckle reduction.

Figure 6A:
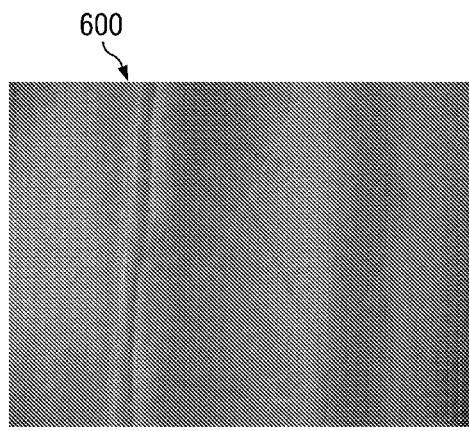
FIGS. 6A-6D illustrate the selective application of an electrical field to maximize the number of speckle-reduction modes realized by an electrically controlled diffuser, according to an embodiment of the present invention.
Figure 6B:
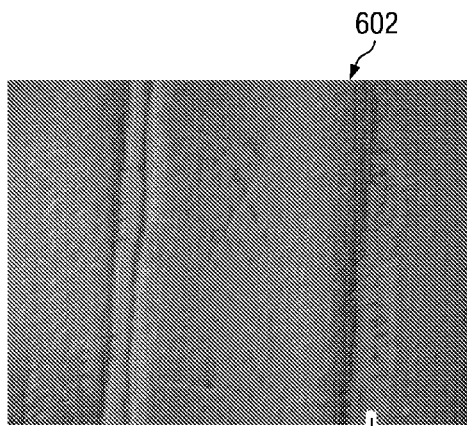

As still another possible modification to the above described systems, the duration during which the electrical signal is applied to an NLC layer may be selected to maximize the number of speckle-reduction modes realized by the NLC layer. For example, the electrical signal may be applied to a NLC layer for a substantially longer period of time than that described above for a NLC layer. Such an embodiment is illustrated in FIGS. 6A-6D. Specifically, FIG. 6A illustrates the NLC layer 600 in an off state. Stated differently, FIG. 6A illustrates NLC layer 600 before a electrical signal is applied across NLC layer 600. In the illustrated "off" state, the molecules in NLC layer 600 operate to produce a significant amount of diffusion. By contrast, FIG. 6B illustrates NLC layer 602 immediately after a electrical signal is applied and while NLC layer 602 is still in the "on state." The electrical signal causes molecules in NLC layer 602 to begin to pool together, for example as in region 604. The speckle pattern or mode generated in this state 602 is substantially different than that in an image projected through state 600. The temporal sequence of the molecular orientation 600 and 602 together reduces the speckle more than any of these alone.

Figure 6C:
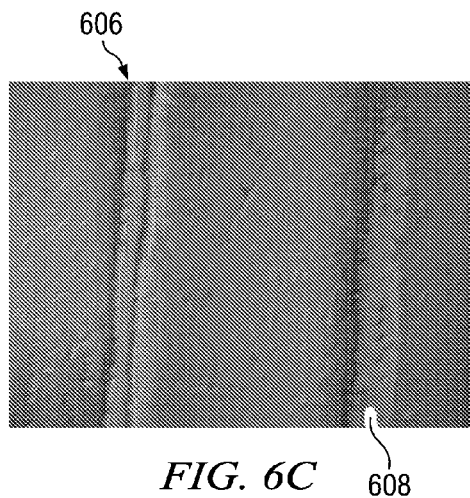
Figure 6D:
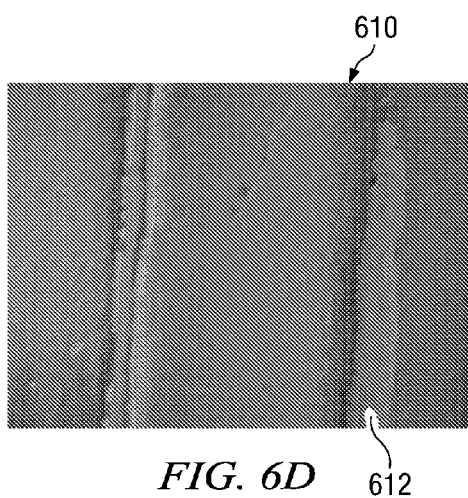

While still in the "on state," FIG. 6C illustrates NLC layer 606 after approximately one second of applied voltage. As illustrated, NLC layer 606 is still in the "on state," and even more pooling of molecules is occurring in the region 608. Although there may still be some amount of diffusion in this speckle-reduction state, there is less speckle in an image projected through a temporal sequence of NLC layer 600, 602, and 606 than through NLC layer 602 and 600 alone. After two seconds of applied voltage, as shown in FIG. 6D, still more pooling of NLC layer 610 is shown in region 612. In particular embodiments, there may be the least amount of diffusion in the illustrated speckle-reduction state for an image projected through NLC layer 610 than through NLC layers 606, 602, and 600. Accordingly, as shown in the phase variations illustrated in FIGS. 6A-6D, different speckle-reduction modes are obtained at different stages during the application of a voltage across an NLC layer. When the electrical signal is removed from NLC layer 610, NLC layer 610 may return to something that once again resembles FIG. 6A. By controlling the electrical signal amplitude over a period of time and by varying the amplitude abruptly in a pseudo-random fashion, further speckle reduction modes may be achieved. Moreover, if two independent LC layers are cascaded, even more speckle reduction may be obtained by independently controlling their drive voltages. For example, their drive voltages may be independently controlled so that while a higher voltage is applied to one layer, a lower voltage may be applied to the other layer at the same time.

Other possible modifications to the systems described above may include varying the materials used in the electrically controlled diffuser. For example, although the above description primarily discusses using Nematic LC materials in the electrically controlled diffuser, the Nematic LC materials described above may be replaced with other LC materials. For example, one or more Cholesteric LC (ChLC) layers may be used in the place of the NLC layers described above. The ChLC layer may include a normal mode or reverse node device. A typical normal-mode ChLC layer is translucent in the voltage off state and transparent in the voltage on state. Further, since during the rise and fall times of the applied voltage, the phase variation (or molecular orientation) is changing gradually, the response times of the molecules within the ChLC layers may be used to realize an electrically varying optical diffuser based on typical ChLC layers. For example, when the ChLC layer is turned from the off state to an on state, at the moment when the ChLC layer reaches the on state, the ChLC layer may be immediately turned off. Conversely, the moment an off state transition is completed, the ChLC layer may be switched back into the on state. By continuously repeating this process, an electrically varying diffuser may be provided. To improve performance, two or more ChLC layers may be cascaded optically and their drive signals in an alternating temporal fashion to provide constant diffusion.

Moreover, a normal mode CHLC layer and a reverse mode CHLC layer may be cascaded together. This will allow the use of only one drive signal to control both the layers simultaneously. This is because a normal mode CHLC is translucent in the off state and transparent in the on state, whereas the reverse mode is the exact opposite of this. Hence while an electrical drive signal is applied to the two cascaded layers, CHLC1, i.e.: the normal mode layer, will be transparent while the CHLC2, i.e.: the reverse mode layer, will be in the translucent. This condition will reverse when the electrical drive signal is turned off. Continuous fast alternation of the electrical drive signal will provide temporally varying amount of diffusion that will seem roughly constant on a time scale of the human observer's retina and hence help reduce speckle. The thickness of the CHLC layers, their electrical drive signal amplitude and frequency, the materials used for making the CHLC layer, and the process for fabricating these CHLC layers can be controlled to optimize their behavior for speckle reduction purposes. Use of more than two layers will further help reduce speckle.

As still other possible modifications, one or more Polymer Dispersed LCs (PDLCs) or Polymer Stabilized LCs (PSLCs) may be used. The PDLCs or PSLCs may be cascaded together and their drives electrically toggled to get constant diffusion. Further, the polymer network density of the PDLCs and PSLCs may be varied spatially. As a result, the diffusion amount of such PDLCs and PSLCs may also be varied. In a particular embodiment, a pseudo-random amplitude mask may be used while exposing the LC layer to Ultraviolet light for polymerization. Such a pseudo-random amplitude mask may result in spatially varying extent of the diffusion amount which means the response time and hence the traversing optical phase-front will change based upon time and applied electrical signal and hence help in reducing speckle.

Although the present invention has been described in detail, it should be understood that the various changes, substitutions, and alterations could be made hereto without departing from the spirit and scope of the invention as defined by the appended claim. For example, although the particular embodiments described above are disclosed to incorporate liquid crystal technology, it is recognized that other electro-optic materials that are not homogeneous can also be used. As another example, although the particular embodiments described above are disclosed to be applicable to coherent light produced by a laser for projection imaging systems, it is recognized that the above described technology may be modified for application to LC micro-display televisions, flat LC displays, and other imaging systems. As still another example, although the electrically controlled diffuser is described as being incorporated into the display screen, it is recognized that the electrically controlled diffuser may be disposed elsewhere in the imaging system. For example, the electrically controlled diffuser may be placed inside the projection lens at an intermediate image plane. Alternatively, the electrically controlled diffuser may be used in the light source to replace a spinning diffuser where employed. Still other changes, substitutions, and alterations could be made to the above-described embodiments without departing from the spirit and scope of the invention as defined by the appended claim.

As another example, another possible application for such an electrically controlled diffuser may be in optical systems that use narrowband sources such as those filtered from a broadband source, e.g.: arc lamp. Typically, speckle depends upon the linewidth of the source. A broader linewidth typically means shorter coherence length and lower speckle. As the linewidth decreases, the behavior of a certain light source becomes closer to that of a laser. As a result, its coherence length increases resulting in higher value of speckle. Such sources are used in microlithography for depositing fine sub-microscopic features for semiconductor fabrication. Presence of speckle artifacts may result into the presence of grainy patterns on the fine features that are intended to be deposited onto semiconductors by copying from masks through UV exposure of these masks. These grainy patterns may alter the electrical and other properties of the semiconductors in an undesired fashion. The use of an electrically controlled diffuser may help mitigate these artifacts and help improve the performance of the fabricated semiconductors.

What is claimed is:

1. A method for reducing speckle in an image produced from a coherent light source, the method comprising:
   providing a display screen comprising a first substrate, a second substrate, and a liquid crystal layer disposed between the first and second substrates, the liquid crystal layer comprising a plurality of molecules;
   directing a beam of coherent light at the display screen;
   applying an electrical signal to the liquid crystal layer to produce an electrical field traversing across the liquid crystal layer from the first substrate to the second substrate, the electrical signal repeatedly transitioning the plurality of molecules between a first state and a second state, the plurality of molecules having a different random orientation in each first state, the plurality of molecules substantially aligned with the electrical field in the second state; and
   wherein the varied application of the electrical signal results in the plurality of molecules being in the first state a majority of an operational period such that a sequence of randomly oriented first states reduces spatial coherence in an image projected through the liquid crystal layer.

2. A method for reducing speckle in an image produced from a coherent light source, the method comprising:
   directing a beam of coherent light at an electrically controlled diffuser comprising:
      a first substrate;
      a second substrate; and
      a liquid crystal layer disposed between the first and second substrates;
   applying an electrical signal to the electrically controlled diffuser to produce an electrical field, the electrical signal repeatedly transitioning the controlled diffuser between a first state in which the liquid crystal layer has a random molecular orientation and a second state, the varied application of the electrical signal results in the liquid crystal layer being in the first state a majority of an operational period such that a sequence of randomly oriented first states reducing spatial coherence in an image projected through the electrically controlled diffuser.

3. The method of claim 2, wherein the liquid crystal layer selected from the group consisting of Nematic LC (NLC), Bi-stable Nematic LC, Cholesteric LC (ChLC), Discotic LC, and Ferroelectric LC (FLC).

4. The method of claim 3, wherein:
   the liquid crystal layer comprises a plurality of molecules;
   the plurality of molecules having a random orientation in the first state; and
   the plurality of molecules substantially aligned with the electrical field in the second state.

5. The method of claim 3, wherein:
   the liquid crystal layer comprises a plurality of molecules;
   the plurality of molecules having a first random orientation in the first state; and
   the plurality of molecules having a second random orientation in the second state.

6. The method of claim 2, wherein the liquid crystal layer comprising a first set of molecules associated with a first material and a second set of molecules associated with a second material.

7. The method of claim 2, wherein the first substrate comprises a Fresnel lens and the second substrate comprises a lenticular array.

8. The method of claim 2, wherein:
the first substrate has a full width half maximum diffusion angle on the order of between approximately 0.1° and 40°; and
the second substrate comprises a reflective diffuse projection screen.

9. The method of claim 2, wherein directing the coherent light beam comprises directing a beam of coherent light produced by a narrowband light source.

10. The method of claim 2, wherein directing the coherent light beam comprises directing a beam of coherent light produced by an array of narrowband light sources.

11. The method of claim 2, wherein applying the electrical signal comprises:
applying a first electrical signal at a first level to the electrically controlled diffuser to transition the electrically controlled diffuser into the second state;
applying a second electrical signal at a second level to the electrically controlled diffuser while the electrically controlled diffuser is in the second state, the second electrical signal less than the first electrical signal; and
removing the electrical signal to the electrically controlled diffuser to transition into a third state.

12. The method of claim 2, wherein directing the beam of coherent light at the electrically controlled diffuser comprises:
directing the beam of coherent light a plurality of cascaded liquid crystal (LC) layers;
applying an electrical signal to each of the plurality of cascaded LC layers to produce an electrical field and to transition each of the plurality of cascaded LC layers between a first state and a second state, a first one of the plurality of cascaded LC layers in the first state when a second one of the plurality of cascaded LC layers is in the second state, the first one of the plurality of cascaded layers in the second state when the second one of the plurality of cascaded LC layers is in the first state.

13. A system for reducing speckle in an image produced from a coherent light source, the method comprising:
a light source operable to transmit a beam of coherent light;
an electrically controlled diffuser operable to receive the beam of coherent light, the electrically controlled diffuser comprising:
a first substrate;
a second substrate; and
a liquid crystal layer disposed between the first and second substrates; and
a controller operable to apply an electrical signal to the electrically controlled diffuser to produce an electrical field, the electrical signal varied to transition the electrically controlled diffuser between a first state which the liquid crystal layer has a random molecular orientation and a second state, the varied application of the electrical signal results in the liquid crystal layer being in the first state a majority of an operational period such that a sequence of randomly oriented first states reducing spatial coherence in an image projected through the electrically controlled diffuser.

14. The system of claim 13, the liquid crystal layer selected from the group consisting of Nematic LC (NLC), Bi-stable Nematic LC, Cholesteric LC (ChLC), Discotic LC, and Ferroelectric LC (FLC).

15. The system of claim 13, wherein:
the liquid crystal layer comprises a plurality of molecules;
the plurality of molecules having a random orientation in the first state; and
the plurality of molecules substantially aligned with the electrical field in the second state.

16. The system of claim 13, wherein:
the liquid crystal layer comprises a plurality of molecules;
the plurality of molecules having a first random orientation in the first state; and
the plurality of molecules having a second random orientation in the second state.

17. The system of claim 13, wherein the first substrate comprises a Fresnel lens and the second substrate comprises a lenticular array.

18. The system of claim 13, wherein:
the first substrate having a full width half maximum diffusion angle on the order of between approximately 0.1° and 40°; and
the second substrate comprises a reflective diffuse projection screen.

19. The system of claim 13, wherein the light source comprises a narrowband light source.

20. The system of claim 13, wherein the light source comprises an array of narrowband light sources.

21. The system of claim 13, wherein:
the electrically controlled diffuser comprises a plurality of cascaded liquid crystal (LC) layers; and
the controller is operable to apply the electrical signal to the plurality of cascaded LC layers to produce an electrical field and to transition each of the cascaded LC layers between a first state and a second state, a first one of the plurality of cascaded LC layers in the first state when a second one of the plurality of cascaded LC layers is in the second state, the first one of the plurality of cascaded LC layers in the second state when the second one of the plurality of cascaded LC layers is in the first state.

22. The system of claim 13, the liquid crystal layer comprising at least two sets of molecules, each of the at least two sets of molecules comprised of a different material.

* * * * *